(12) United States Patent
Schroeder et al.

(10) Patent No.: US 6,354,641 B1
(45) Date of Patent: Mar. 12, 2002

(54) AUTOMOBILE BUMPER RETENTION SYSTEM

(75) Inventors: Del C. Schroeder, Bloomfield Hills; Gary R. Slusser, Clinton Township; David G. Speth, Sylvan Lake, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/379,085

(22) Filed: Aug. 23, 1999

(51) Int. Cl.⁷ .......................... B60R 19/24; B60R 19/03; B60R 19/04
(52) U.S. Cl. ....................... 293/155; 293/132; 293/136; 293/122
(58) Field of Search ................................ 293/155, 132, 293/133, 136, 120, 122, 128

(56) References Cited

U.S. PATENT DOCUMENTS

| | | | | |
|---|---|---|---|---|
| 3,782,767 A | * | 1/1974 | Moore | 296/71 R |
| 3,827,741 A | * | 8/1974 | Howell et al. | 293/155 |
| 4,030,735 A | * | 6/1977 | Jacob et al. | 293/122 |
| 4,066,285 A | * | 1/1978 | Hall et al. | 2983/120 |
| 4,088,357 A | * | 5/1978 | Klie et al. | 293/98 |
| 4,109,951 A | * | 8/1978 | Weller | 293/155 |
| 4,320,913 A | * | 3/1982 | Kurado | 293/120 |
| 4,325,574 A | * | 4/1982 | Umemoto et al. | 293/120 |
| 4,348,042 A | * | 9/1982 | Scrivo | 293/120 |
| 4,361,352 A | * | 11/1982 | Wakamatsu | 293/120 |
| 4,422,680 A | * | 12/1983 | Goupy | 293/126 |
| 4,474,395 A | * | 10/1984 | Harloff et al. | 293/136 |
| 4,482,180 A | * | 11/1984 | Huber et al. | 293/136 |
| 4,786,093 A | * | 11/1988 | Nishii | 293/155 |
| 4,808,451 A | * | 2/1989 | McCue et al. | 293/126 |
| 4,911,971 A | * | 3/1990 | McCue et al. | 293/126 |
| 4,941,701 A | * | 7/1990 | Loren | 293/155 |
| 4,988,137 A | * | 1/1991 | Fleming | 293/120 |
| 5,066,057 A | * | 11/1991 | Furuta et al. | 293/155 |
| 5,149,569 A | * | 9/1992 | McCue | 293/126 |
| 5,154,462 A | * | 10/1992 | Carpenter | 293/120 |
| 5,202,172 A | * | 4/1993 | Graf | 293/128 |
| 5,219,197 A | * | 6/1993 | Rich et al. | 293/120 |
| 5,271,650 A | * | 12/1993 | Fukuhara et al. | 293/120 |
| 5,290,078 A | * | 3/1994 | Bayer et al. | 293/120 |
| 5,407,239 A | * | 4/1995 | Arai et al. | 293/155 |
| 5,441,319 A | * | 8/1995 | Oyama et al. | 293/155 |
| 5,536,540 A | * | 7/1996 | Borys et al. | 293/128 |
| 5,651,569 A | * | 7/1997 | Molnar | 293/155 |
| 5,658,027 A | * | 8/1997 | Eissinger et al. | 293/120 |
| 5,785,367 A | * | 7/1998 | Baumann et al. | 293/133 |
| 5,988,713 A | * | 11/1999 | Okamura et al. | 293/120 |
| 6,003,912 A | * | 12/1999 | Schonhoff et al. | 296/122 |
| 6,102,470 A | * | 8/2000 | Heim et al. | 293/133 |

* cited by examiner

*Primary Examiner*—Stephen T. Gordon
*Assistant Examiner*—Hillary Gutman
(74) *Attorney, Agent, or Firm*—Mark P. Calcaterra

(57) ABSTRACT

An automobile bumper retention system is provided including a plastic foam energy absorbent bumper which is held firmly in place by a metal bumper beam. The beam is provided with integral ribs or beads that fit into a matching groove in the energy absorbing bumper in order to support the energy absorbing bumper in a snap-fit engagement or a slide-in engagement.

8 Claims, 3 Drawing Sheets

AUTOMOBILE BUMPER RETENTION SYSTEM

BACKGROUND OF THE INVENTION

FIELD OF THE INVENTION

The present invention relates generally to an energy absorbent vehicle bumper, and more particularly to an automobile bumper retention system.

BACKGROUND OF THE INVENTION

The Federal Motor Vehicle Safety Standards (FMVSS) include specified requirements regarding front and rear bumper systems. These standards have been established so that all vehicles must meet the FMVSS in order to be certified as a saleable vehicle. The standards are set as the lowest specification level to be achieved for approval. in the case of bumpers, the FMVSS have greatly helped in reducing damage to vehicles from collisions occurring during parking maneuvers, traffic jams and in confined garages, etc. The vehicles are fitted with bumpers which are capable of absorbing the impact of a collision up to a certain speed without damaging to the vehicle. A conventional vehicle bumper incorporates a strong steel beam which extends across the vehicle and is secured to the supporting elements of the vehicle structure. An energy absorbing mechanism is secured to the steel beam and a continuous elastic casing conceals the steal beam and energy absorbing mechanism. Many designs have been implemented for securing the energy absorbing mechanism to the beam. Many of these designs have complex and expensive assembly systems for mounting the energy absorbing mechanism to the steel beam. Furthermore, manufacture of these bumper systems involves the use of complicated production equipment which increases the cost of the bumper.

SUMMARY OF THE INVENTION

It is an object of the present invention to eliminate the mentioned disadvantages of prior art bumper systems and to provide an energy absorbing bumper retention system which is simple to assemble.

These and other objects of the present invention are obtained by providing an automobile bumper retention system including a rigid metal beam member and an energy absorbing bumper in snap-fit or slide-in engagement with the beam member. A bumper fascia is disposed over the energy absorbing bumper and is configured generally to a shape of the energy absorbing bumper such that the energy absorbing bumper provides inward support behind the bumper fascia.

The invention provides a simple locking mechanism including the beam cross member having an integral metal retaining rib or flange which protrudes into opposing molded-in grooves in the energy absorbing bumper in order to provide the snap-fit or slide-in engagement between the beam and the energy absorbing bumper.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more filly understood from the detailed description and the accompanying drawings, wherein.

DETAILED DESCRIPTION OF THE PREFERRED EMBODIMENTS

Figure 1:
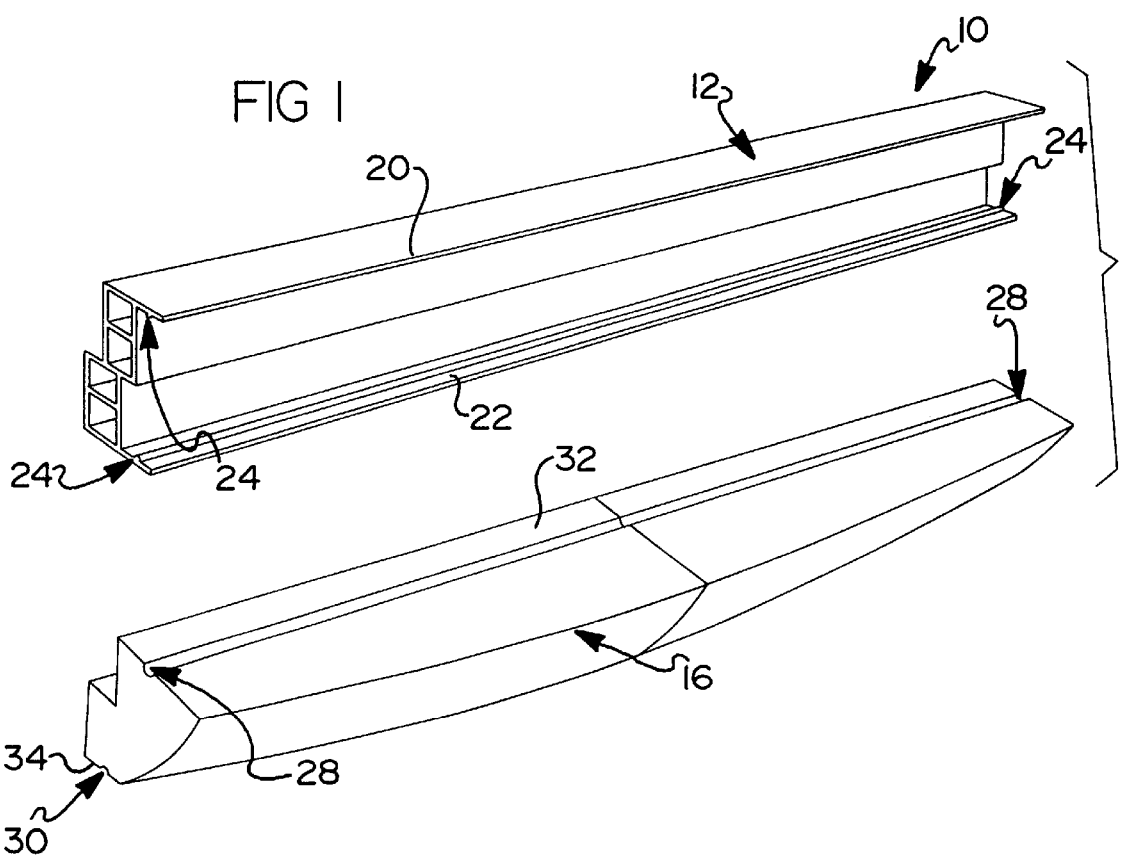
FIG. 1 is an exploded perspective view of the automobile bumper retention system according to the principles of the present invention.

With reference to FIGS. 1–5, the automobile bumper retention system 10 according to the principles of the present invention will now be described. Generally, the automobile bumper retention system 10 includes a support beam 12 which is fixed to the frame rails 14, preferably by welding. An energy absorbent bumper 16 is supported by the beam 12 in a snap-fit or alternatively a slide-in engagement.

The beam 12 can be formed of rigid metal such as aluminum or steel. In the embodiments shown, the beam 12 is made from extruded aluminum having reinforcing ribs 18 for added strength while keeping the wall thickness relatively thin for reduction of weight. The beam 12 includes an upper flange portion 20 and a lower flange portion 22 each provided with an integrally formed projecting rib 24. The projecting rib 24 disposed on the upper flange portion 20 extends downward toward the lower flange portion and the rib 24 on the lower flange portion 22 extends upward toward the upper flange portion 20.

The energy absorbent bumper 16 is preferably formed from molded cellular plastic foam. The plastic foam can be selected from a variety of plastic foams such as urethane, polypropylene, and polystyrene. In addition, a solid plastic honeycomb configuration could also be used. The energy absorbent bumper 16 is provided with upper and lower retaining grooves 28, 30, respectively. The energy absorbent bumper 16 is engaged with the beam 12 by sliding the upper surface 32 and lower surface 34 between the upper and lower flange portions 20, 22 of beam 12 and pressing the energy absorbent bumper 16 inward so that the integral projecting ribs 24 engage the upper and lower retaining grooves 28, 30. Alternatively, the energy absorbent bumper 16 can be attached to the beam 12 by slide-in engagement, wherein the energy absorbent bumper 16 is slidably received by the beam 12 so that the projecting ribs 24 slidably engage the upper and lower grooves 28, 30.

Figure 4:
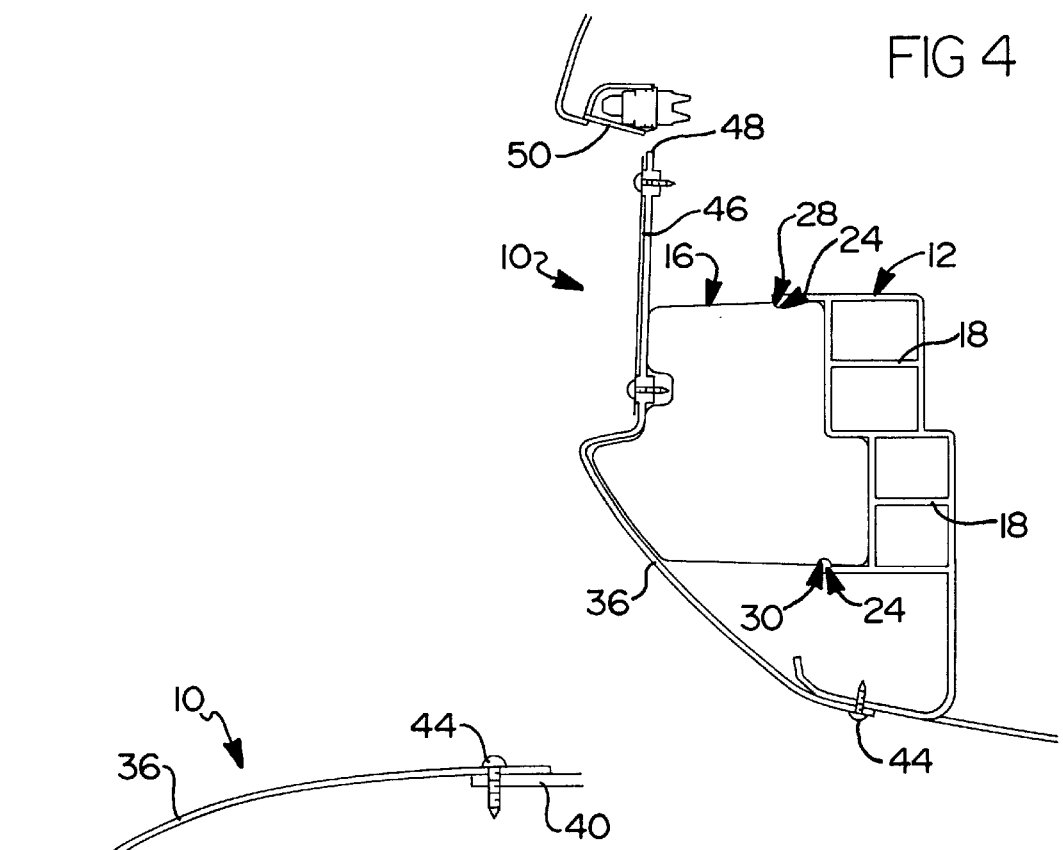
FIG. 4 is a cross-sectional view taken through the center of an automobile bumper retention system including a license plate assembly, according to the principles of the present invention.
Figure 5:
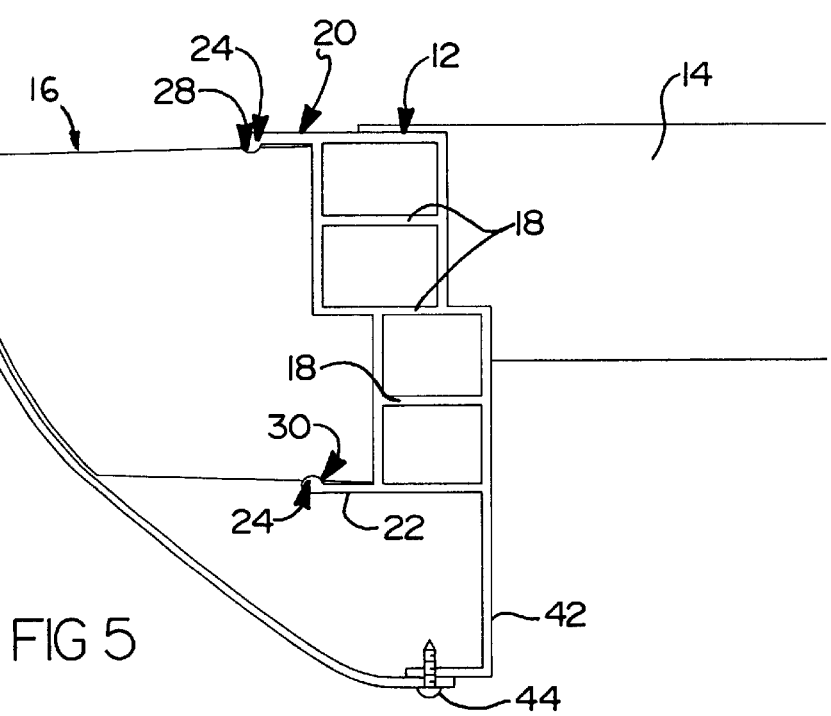
FIG. 5 is a cross-sectional view of the automobile bumper retention system according to the principles of the present invention.

As best shown in FIGS. 4 and 5, a fascia panel 36 is provided in covering relationship over the energy absorbent bumper 16. The energy absorbent bumper 16 is configured to provide inward support to the fascia 36 so that the curvature of the energy absorbent bumper 16 matches the inward curvature of the fascia 36. Due to the added support of the energy absorbent bumper 16 behind the flexible bumper fascia 36, the bumper fascia 36 can be made more flexible and therefore less susceptible to damage in low speed impacts. As shown in FIG. 5, the fascia is supported by mounting brackets 40, 42 which are mounted to the vehicle body ad frame structure. The fascia 36 is mounted by fasteners 44 as is well known in the art.

FIG. 4 shows a cross-sectional view through the center of a rear bumper having a license plate 46 mounted thereto. A lamp cut-out 48 is provided in the fascia 36 and a light assembly 50 is mounted within the lamp cut-out for illuminating the license plate 46.

Figure 2:
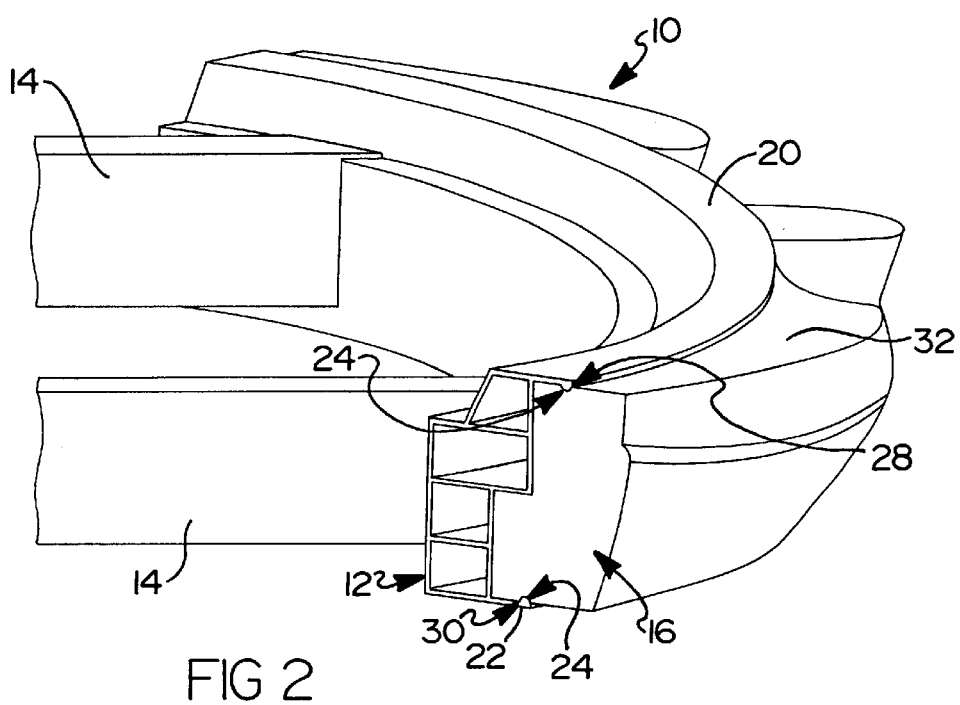
FIG. 2 is a perspective view of an automobile bumper retention system according to a second embodiment of the present invention.
Figure 3:
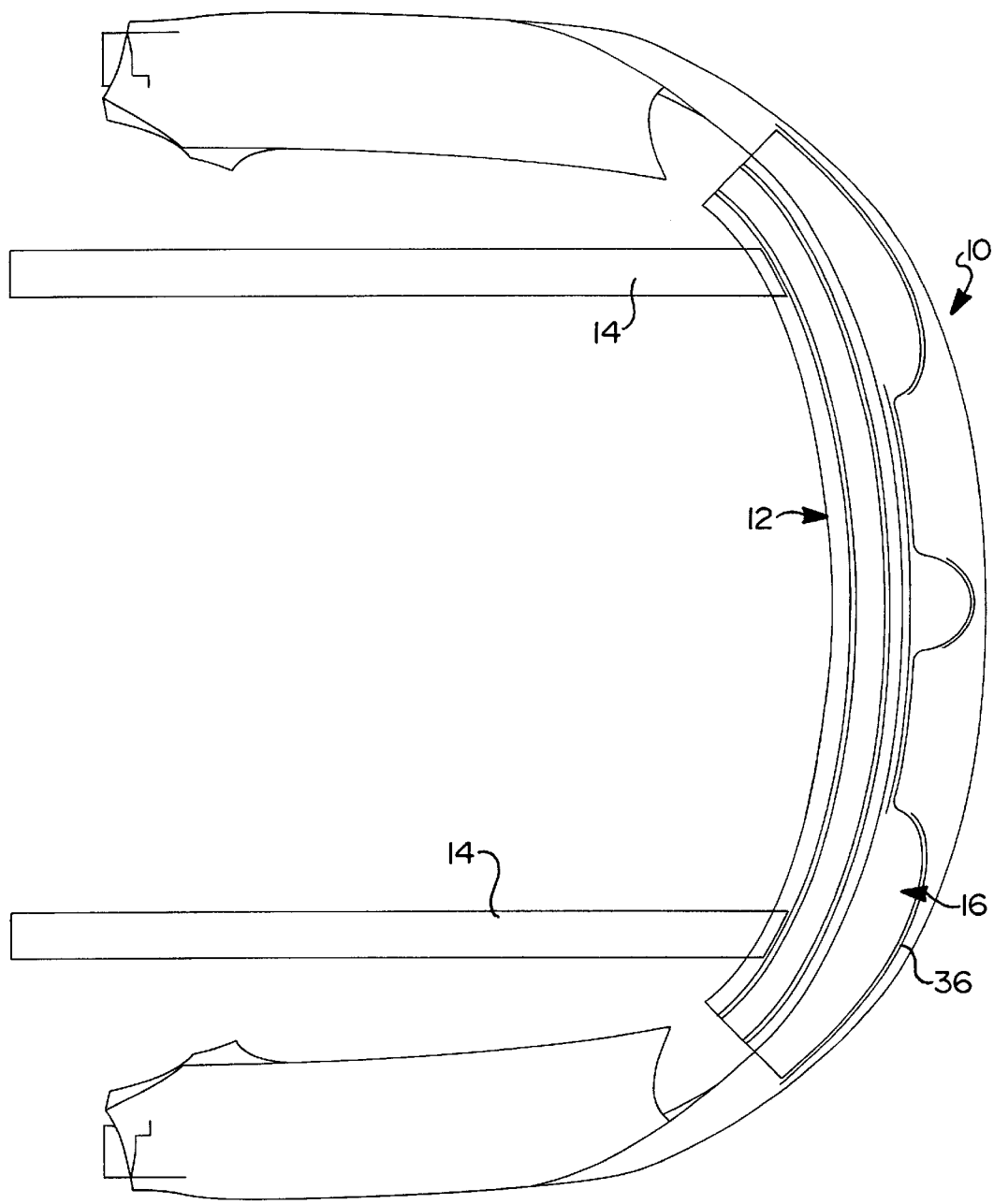
FIG. 3 is a top view of the automobile bumper retention system shown in FIG. 2.

The bumper retention system of the present invention can be utilized with a straight bumper configuration as shown in FIG. 1, or with a curved bumper as shown in FIG. 2.

The automobile bumper retention system of the present invention simplifies the assembly of the automotive energy absorption bumper system. The design of the present invention eliminates parts and reduces assembly labor. Vehicle quality will be greatly enhanced since many small retaining parts and hand assembly operations will be eliminated with the present invention. The invention applies to both the front and rear bumper systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automobile bumper retention system, comprising:
   a rigid metal beam member including a pair of mounting ribs;
   an energy absorbent bumper made from a molded cellular plastic foam including a pair of recessed grooves in direct snap-fit engagement with said mounting ribs of said beam member; and
   a bumper fascia disposed over said energy absorbent bumper, wherein said energy absorbent bumper is configured generally to a shape of said bumper fascia to provide support behind said bumper fascia.

2. The bumper retention system according to claim 1, wherein said rigid metal beam member is made from extruded aluminum.

3. An automobile bumper retention system comprising:
   a beam member defining a cavity having a plurality of integrally formed reinforcing ribs, said beam member having top and bottom opposing flange portions each provided with a rib projecting toward the opposing flange portion;
   an energy absorbent bumper made from a molded cellular plastic foam having upper and lower surfaces each provided with a retaining groove, said energy absorbent bumper being in snap-fit engagement with said beam member such that said ribs engage said retaining grooves; and
   a bumper fascia disposed over said energy absorbent bumper.

4. The bumper retention system according to claim 3, wherein said energy absorbent bumper supports said bumper fascia.

5. An automobile bumper retention system, comprising:
   a rigid metal beam member defining a cavity having a plurality of integrally formed reinforcing ribs, said rigid metal beam including a pair of mounting ribs;
   an energy absorbent bumper made from a molded cellular plastic foam including a pair of recessed grooves in direct slide-in engagement with said mounting ribs of said beam member; and
   a bumper fascia disposed over said energy absorbent bumper, wherein said energy absorbent bumper is configured generally to a shape of said bumper fascia to provide support behind said bumper fascia.

6. The bumper retention system according claim 5, wherein said rigid metal beam member is made from extruded aluminum.

7. An automobile bumper retention system comprising:
   a beam member defining a cavity having a plurality of integrally formed reinforcing ribs, said beam member having top and bottom opposing flange portions each provided with a rib projecting toward the opposing flange portion;
   an energy absorbent bumper made from a molded cellular plastic foam having upper and lower surface each provided with a retaining groove, said energy absorbent bumper being in slide-in engagement with said beam member such that said ribs engage said retaining grooves; and
   a bumper fascia disposed over said energy absorbent bumper.

8. The bumper retention system according to claim 7, wherein said energy absorbent bumper supports said bumper fascia.

* * * * *